March 23, 1965 J. J. KING 3,175,202

CORE MEMORY APPARATUS

Filed May 9, 1962 4 Sheets-Sheet 1

INVENTOR
JOHN J. KING
BY S. C. Yeaton
ATTORNEY

INVENTOR.
JOHN J. KING
BY S. C. Yeaton
ATTORNEY

INVENTOR.
JOHN J. KING
BY
S. C. Yeaton
ATTORNEY

INVENTOR.
JOHN J. KING
BY
S. C. Yeaton
ATTORNEY

United States Patent Office 3,175,202
Patented Mar. 23, 1965

3,175,202
CORE MEMORY APPARATUS

John J. King, Great Neck, N.Y., assignor to Sperry Rand Corporation, Great Neck, N.Y., a corporation of Delaware Filed May 9, 1962, Ser. No. 193,399
7 Claims. (Cl. 340—174)

Figure 3:
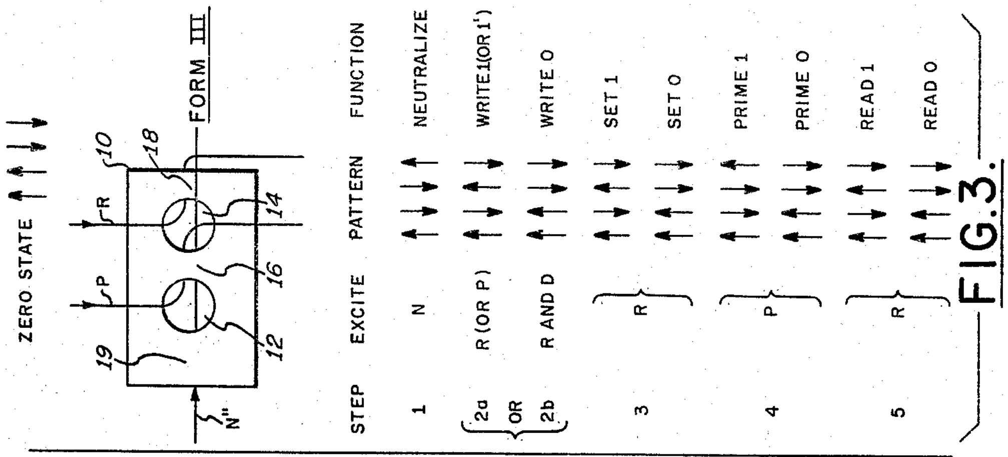

This invention relates in general to data storage equipment and in particular provides a digital computer memory device utilizing bi-aperture ferromagnetic core elements (e.g., the element shown and described in U.S. Patent 2,994,069) which are so wired that memory write-in and read-out operations are performable by the same addressing equipment, such read-out operations requiring (as is known) that addressed elements be primed before having their respective stored data sensed, i.e., read (see U.S. Patent 2,803,812).

Prior art memory devices utilizing bi-aperture ferromagnetic elements are typified by the circuit shown and described on page 115 (FIG. 16) of the Proceedings of the IRE, volume 49, No. 1, January 1961. Aside from indicating the necessity for distinct write-in and read-out equipments, this reference teaches prior art reliance on half-selected coincident current techniques for addressing: Distinct write-in and read-out addressing equipments have the disadvantage of requiring too much apparatus to do two almost identical jobs; addressing a core memory device by means of half-select coincident currents has the disadvantage of making such device temperature sensitive, i.e., because the hysteretic properties of ferromagnetic core elements vary with temperature (an increasing ambient temperature decreases the size of the hysteresis curve of a core element and vice versa) half-select currents must be controlled within close limits. With too small currents, addressing may not be effected; with too large currents, addressing other than an intended element may occur. By means of the invention the duplication of equipment is avoided as herebefore mentioned; temperature sensitivity is avoided by use of only substantial full-select addressing currents.

Bi-aperture elements such as are described in U.S. Patent 2,994,069 have two narrow readily saturable legs and one wide leg requiring for saturation at least twice the flux necessary to saturate a narrow leg; each such element has magnetic fields of the same direction in its narrow legs when in a first storage condition, e.g., when storing a ZERO, and fields of opposite directions in those legs when in a second storage condition, e.g., when storing a ONE.

A memory device embodying the invention and having the aforementioned features must be word organized and have respective neutralizing leads for each word location in the memory device. Each neutralizing lead is so threaded to link the elements of its respective word that, when excited, it drives flux in every linked element in directions to cancel stored ZEROS. This can be done in any one of three different ways as will be described later. To write a ONE in a given core element, flux is driven in one of its narrow legs in a direction counter to the direction of flux in the wide leg when the element stores a ZERO; to write a ZERO in the element, flux is driven in both narrow legs in directions counter to the direction of flux in the wide leg when the element stores a ZERO. Then the element is "set" for reading purposes by driving the flux in the element narrow leg which is adapted to contain (when the element stores a ZERO) flux having the same direction as the flux in the wide leg, such flux being driven in that direction. The data stored in the element may then be read-out by first priming, i.e. driving flux (in the opposite direction to the direction of flux in the element wide leg when it stores a ZERO) in the narrow leg which is adapted to contain flux having different directions depending on whether the element stores a ONE or a ZERO, and then reading the element, i.e., driving flux in the other narrow leg in a direction which is the same as the direction that flux is driven when priming. If, when reading, the flux directions in the narrow legs change, the element is known to store a ONE; if there is no flux direction change, the element is known to store a ZERO.

A principal object of the invention is to provide a computer memory apparatus of bi-aperture ferromagnetic elements which does not require distinct write-in and read-out equipments.

Another object of the invention is to provide a temperature insensitive memory device utilizing bi-aperture ferromagnetic cores.

Another object of the invention is to provide a matrix of bi-aperture ferromagnetic elements which is so arranged that data may be written into the matrix without need for coincident current techniques.

Still another object of the invention is to provide a data handling method for use with bi-aperture ferromagnetic core elements.

Figure 2:
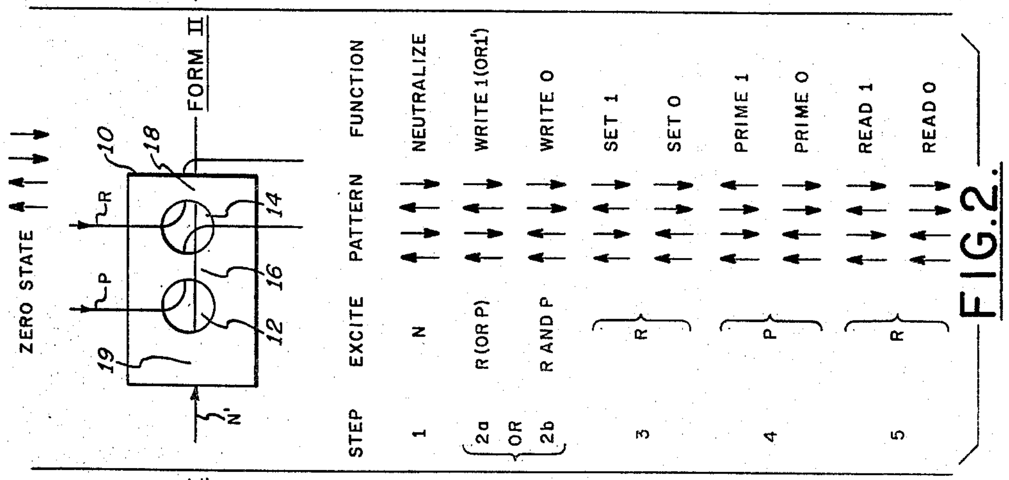
Figure 1:
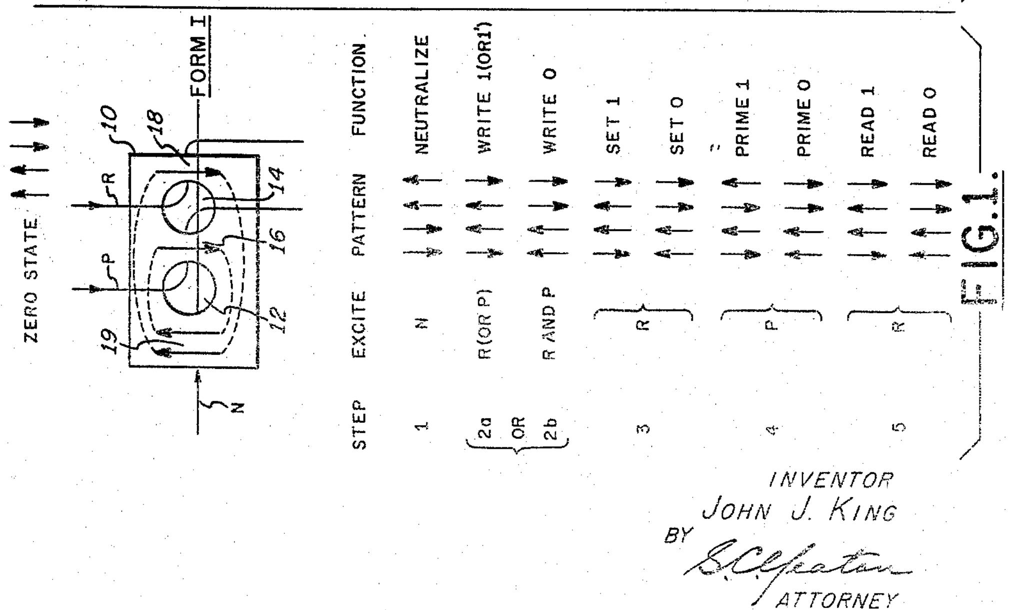
Figure 4:
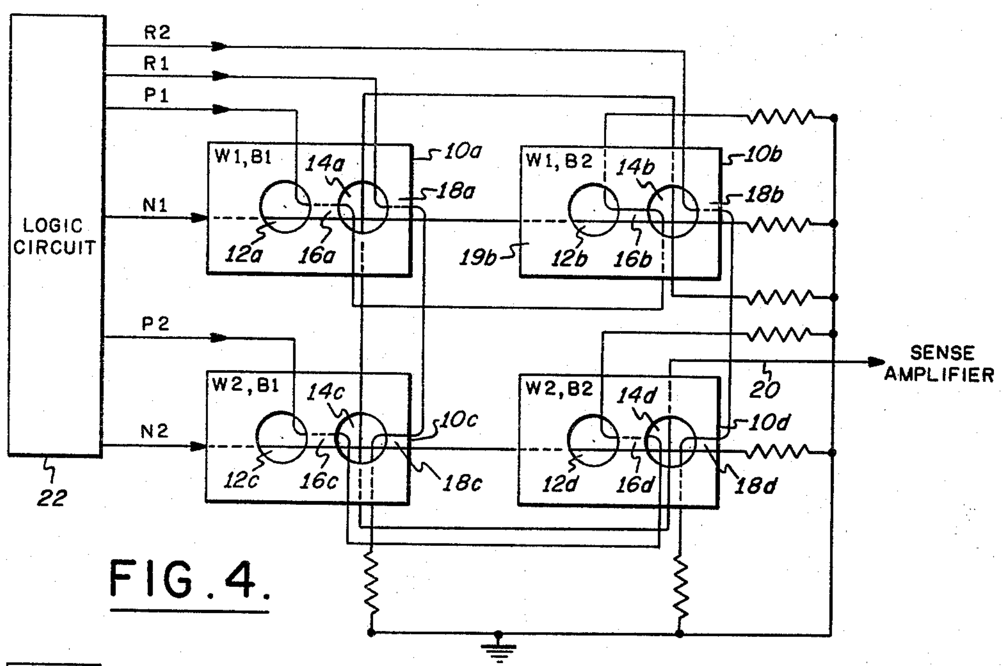
Figure 7:
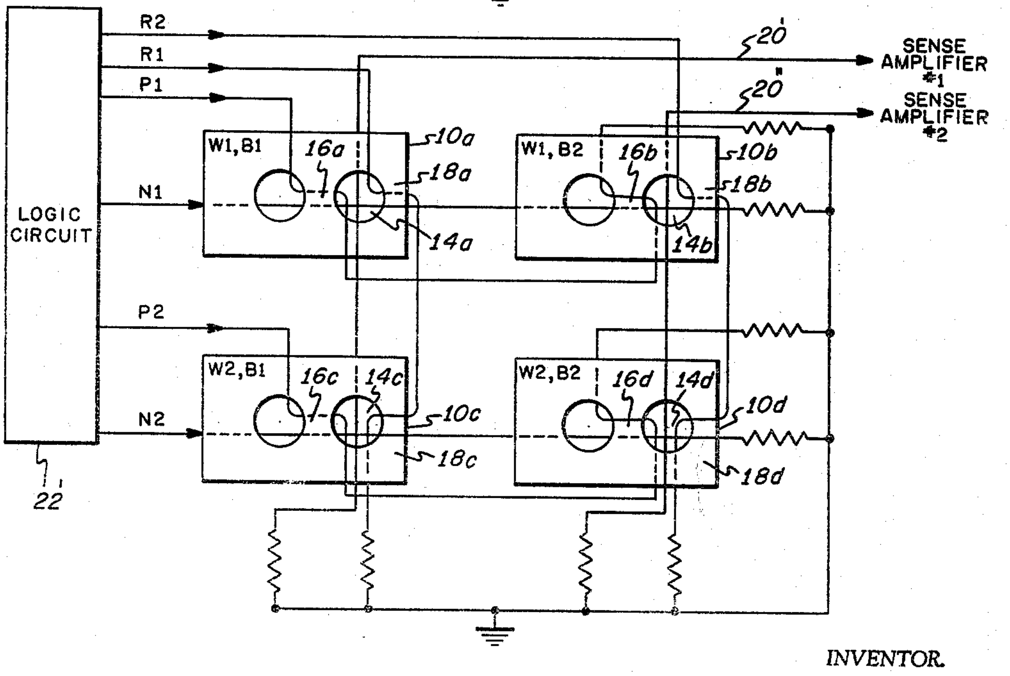
Figure 5:
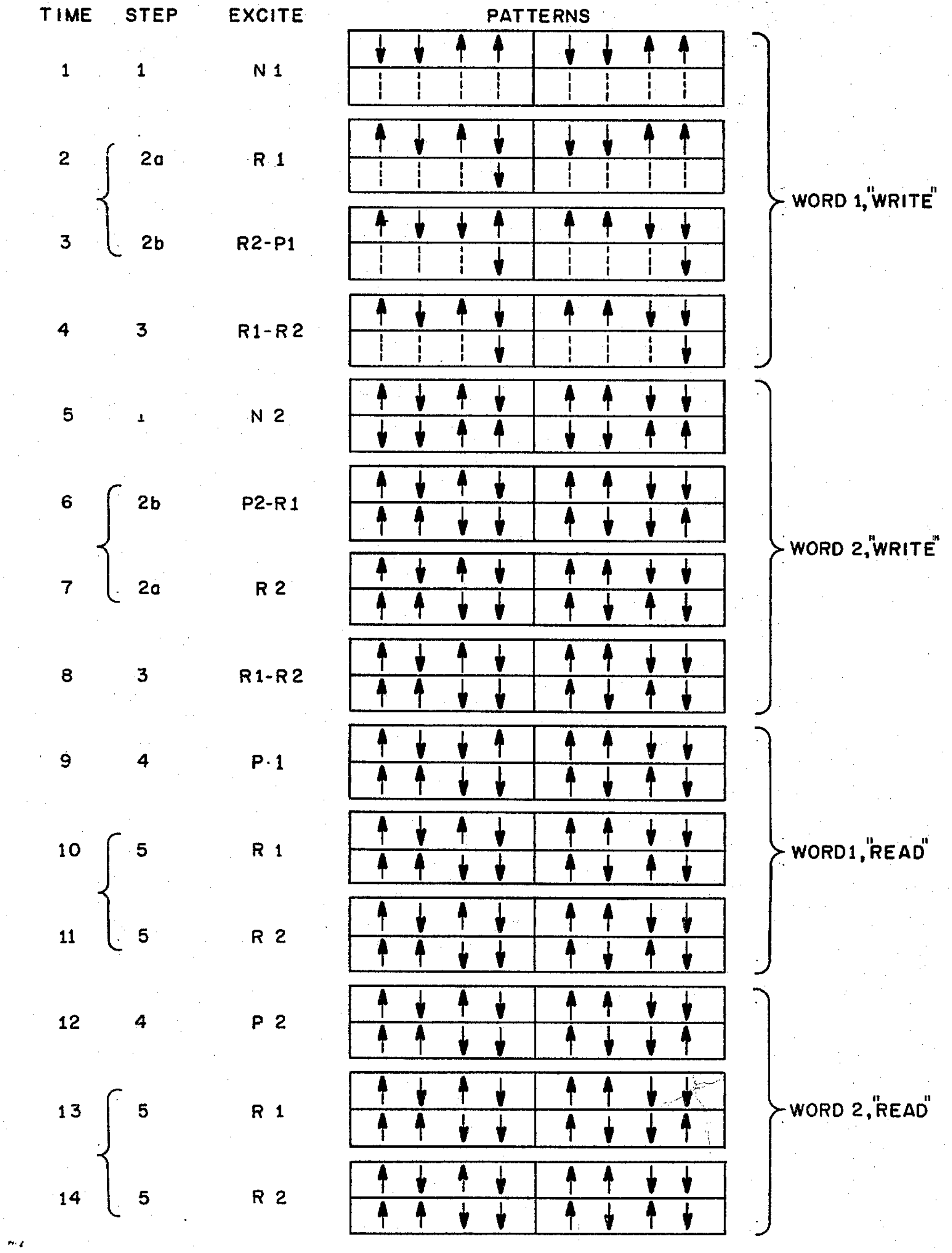
Figure 6:
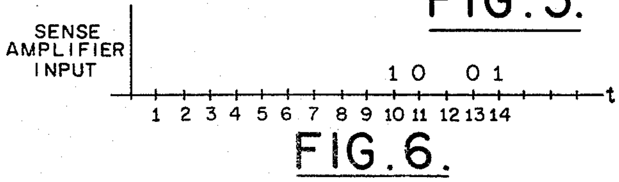
Figure 8:
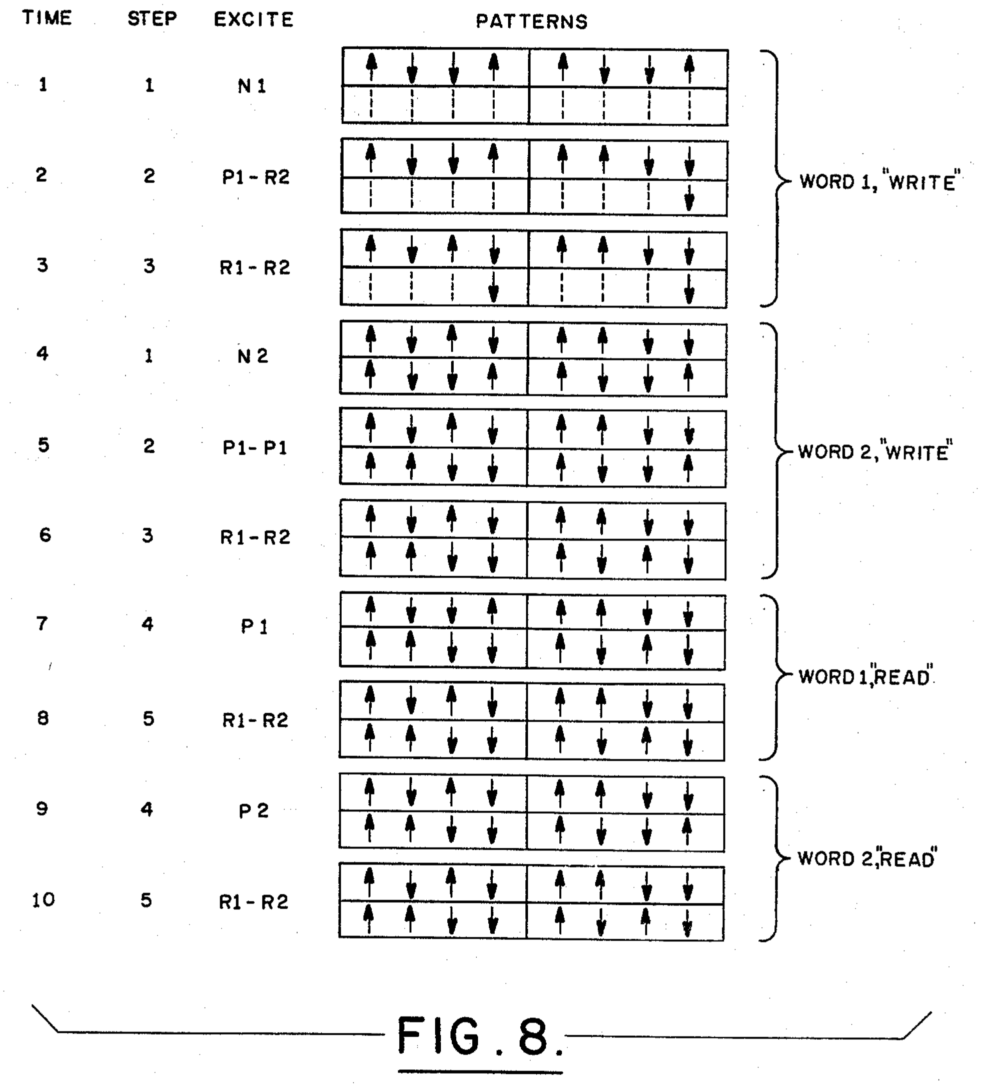
Figure 9:
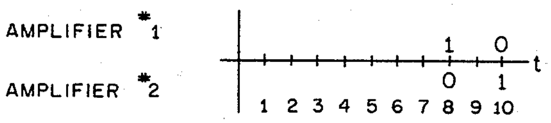

The invention will be described with reference to the figures wherein:

FIG. 1 shows a bi-aperture ferromagnetic core element wired to practice one form of the invention, FIG. 2 shows a bi-aperture element wired to practice a second form of the invention, FIG. 3 shows a bi-aperture element wired to practice a third form of the invention, FIG. 4 is a schematic diagram of a memory circuit of bi-aperture elements embodying the first form of the invention, FIGS. 5 and 6 are diagrams useful in describing the operation of the circuit of FIG. 4, FIG. 7 is a schematic wiring diagram of a memory circuit of bi-aperture elements wired according to the third form of the invention, and FIGS. 8 and 9 are diagrams useful in describing the operation of the circuit of FIG. 7.

Common to all forms of the invention is the requirement that five distinct operations are necessary to write data into and then read such data out of a particular core element, all such forms of the invention being different in only the manner in which the first operation is performed. In all three forms of the invention this first operation (designated the "neutralizing" function) results in the particular core element containing a flux pattern other than the flux pattern associated with the element when it stores a ZERO.

*Form I*

Referring to FIG. 1, a core element 10 having apertures 12 and 14 has a neutralizing lead N threaded through the aperture 12; the apertures 12 and 14 are so positioned on the element 10 that two narrow legs 16 and 18 and one wide leg 19 are provided, such legs having the dimensions herebefore described. When excited by a current flow in the direction indicated, the lead N causes flux in the wide leg 14 to flow in a direction counter to the direction of flux flow in that leg when the element 10 stores a ZERO, i.e., when the lead N is excited flux is driven downwardly in the leg 19. A lead P is threaded into the aperture 12 and out the aperture 14 and causes flux to be driven downwardly in the leg 16 when it is excited by a current flow in the indicated direction. Similarly, a lead R threads through the aperture 14 to link the leg 18 and causes flux in that leg to be driven downwardly when it is excited by a current flow in the indicated direction.

As stated above, five operations or steps are necessary to write data into and then read such data out of the element 10, the legend of FIG. 1 showing that these steps are provided by exciting the leads N, P and R in a particular order. Also shown on FIG. 1 are flux patterns associated with each of the five steps, the first two pattern arrows (reading from left to right) being indicative of the flux direction in the wide leg 19 and the next two arrows being respectively indicative of the flux directions in the legs 16 and 18. To write (either a ONE or ZERO), three steps are necessary: (1) Excite the lead N, thereby causing flux to be driven downwardly in the leg 19 and causing flux to be driven upwardly in both legs 16 and 18. Now the element 10 is neutralized and has a flux pattern exactly opposite the flux pattern in the element when it stores a ZERO. (2) Excite either the lead R (or the lead P) or simultaneously excite the leads R and P to write respectively a ONE or a ZERO. Now, the element contains either a flux pattern as shown at step *2a* or as shown at step *2b*. (3) Excite the lead R to assure that the element will not be readable, but will be in the proper state for reading purposes, i.e., the element flux pattern is either that of a (unprimed) ONE or ZERO. The need for this assurance will be appreciated more fully later in connection with the descriptions relating to the circuits of FIGS. 4 and 7.

To read the element 10, the two-step prior art practice of priming and then reading is performed. Hence, in step 4 the lead P is excited to drive flux in the leg 16 downwardly and then, in step 5, the lead R is excited to drive flux in the leg 18 downwardly. A sense lead (not shown on FIG. 1 for purposes of clairity) detects flux changes in the narrow legs 16 and 18 when the lead R is excited at step 5 and, if a flux change is detected at this time, the element is known to store a ONE; if no flux change is detected, the element is known to store a ZERO.

*Form II*

In Form II, the element 10 (see FIG. 2) has the leads P and R threaded as before. However, instead of the lead N, a lead N′ is threaded into the aperture 12 and out the aperture 14 to cause flux to be driven upwardly in the element leg 16 when the lead N′ is excited by a current flow in the indicated direction. As before, the write and read operations require a total of five steps. However, since the first or "neutralizing" step produces a flux pattern different from the pattern produced at step 1—Form I, the patterns are different for most succeeding writing stteps. To be noted though is that by the time the read operation (i.e., steps 4 and 5) is about to be performed the directions of flux in the legs 16 and 18 are identical to the flux directions obtained in steps 4 and 5 of Form I. With Form II, "neutralizing" step 1 causes the flux pattern contained in the element 10 to be like the pattern associated with it when storing a ONE.

*Form III*

Form III, like Forms I and II, has the leads P and R threaded to drive flux in the legs 16 and 18 downwardly. Here, however, the "neutralizing" lead N″ threads through the aperture 14 to drive (when excited by a current flow in the indicated direction) flux in the leg 18 upwardly. Therefore, when the lead N″ is excited a flux pattern like the flux pattern of a primed ONE occurs. As a result, the flux patterns associated with each writing step are again different in most cases from the patterns obtained during steps 1, 2 and 3 of Forms I and II. However, by the time of steps 4 and 5 the flux directions obtained in legs 16 and 18 are again as in corresponding steps of Forms I and II.

Referring to FIG. 4, a general arrangement of a word organized memory matrix embodying Form I of the invention and adapted for serial write-in and read-out of data has four bi-aperture core elements **10*a*, 10*b*, 10*c* and 10*d*. The elements 10*a* and 10*b* are for storing the first and second bits respectively of a first digital word, and the elements 10*c* and 10*d* are for storing the first and second bits respectively of a second digital word. Threaded through the apertures 12*a* and 12*b* of the elements 10*a* and 10*b* respectively is the "word 1" neutralizing lead N1; similarly a lead P1 threads to link the narrow legs 16*a* and 16*b* of the elements 10*a* and 10*b* respectively. The "word 2" elements are wired in identical manner to the "word 1" elements, being provided with a neutralizing lead N2 and a priming lead P2. A lead R1 threads through the element apertures 14*a* and 14*c* and a lead R2 threads through the element apertures 14*b* and 14*d*, all of the aforementioned leads (N1, N2, P1, P2, R1 and R2) when excited by currents flowing in the indicated directions causing flux in the element legs to which they are respectively coupled inductively to be driven downwardly. A lead 20 threads to link a narrow leg of each element so that a current will be induced to flow in the lead whenever a flux direction changes in any linked leg, thereby providing an input signal to a sense amplifier. A logic circuit 22, forming no part of the invention and employing known AND, OR and NOT circuits, selectively excites the leads N1, N2, P1, P2, R1 and R2** to write and read as will be described presently.

The operation of the memory matrix of FIG. 4 can best be understood by showing how two words, e.g., 10 and 01, are first written into and then read from the FIG. 4 matrix. In the upper left hand corner of each element in the matrix are coordinate adresses, the letters W and B signifying "word" and "bit" respectively and the numerals indicating order (i.e., W1, B1 signifies "word 1, bit 1," etc.). Hence, the task outlined is to make the matrix elements of FIG. 4 store data as follows:

W1, B1=1
W1, B2=0
W2, B1=0
W2, B2=1

Referring to FIGS. 5 and 6, fourteen time increments are shown necessary to perform the aforementioned task, i.e., the words 10 and 01 are written within 8 time increments and then read-out in the next 6 time increments. Adjacent each FIG. 5 indication of time is a respective notation of (1) the step (corresponding to the step of the legend of FIG. 1) being performed, (2) the lead being excited and (3) the flux pattern being produced in each matrix element. With regard to the flux pattern notations, the upper left pattern corresponds to the pattern in the upper left matrix element **10*a*, the upper right pattern corresponds to the pattern in the upper right matrix element 10*b***, etc.

At time 1, the lead N1 is excited, thereby causing the elements **10*a* and 10*b* to have patterns representative of inverted ZEROS, i.e., the elements 10*a* and 10*b* have defined patterns whereas the element 10*c* and 10*d* patterns (indicated by dashed lines) are yet undefined. At times 2 and 3, a ONE and a ZERO are written respectively into the elements 10*a* and 10*b* by exciting first the lead R1 alone and then exciting simultaneously both the leads R2 and P1. Since the flux in both the legs 16*b* and 18*b* is simultaneously driven downwardly at time 3, the leg 19*b* flux is forced upwardly. (The flux directions in the element legs 18*c* and 18*d* become known at times 2 and 3 by virtue of the excitation of the leads R1 and R2.) At time 4, the leads R1 and R2 are excited, with no resulting flux pattern changes because the elements 10*a* and 10*b* are in their proper states for reading purposes, i.e., they store respectively a ONE and a ZERO. Between times 5 and 8, the word 01 is similarly written into the elements 10*c* and 10*d***.

To read-out the word 10 (stored in the elements **10*a* and 10*b*) the lead P1 is excited at time 9 and then in sequence at times 10 and 11 the leads R1 and R2 are excited. To readout the word 01 (stored in the elements 10$c$ and 10**$d$) the leads P2, R1 and R2 are excited in sequence at times 12, 13 and 14.

Referring to FIG. 7, the four elements 10$a$, 10$b$, 10$c$ and 10$d$ are now arranged for parallel write and read operations and to practice Form III of the invention, the neutralizing lead N1 being threaded to link the element legs 18$a$ and 18$b$ and the neutralizing lead N2 being threaded to link the element legs 18$c$ and 18$d$. Similarly, the prime lead P1 threads to link the narrow legs 16$a$ and 16$b$ and the prime lead P2 threads to link the legs 16$c$ and 16$d$. Common to the legs 18$a$ and 18$c$ is a lead R1, a lead R2 being common to the legs 18$b$ and 18$d$. When excited, the aforementioned FIG. 7 leads P1, P2, R1 and R2 drive flux downwardly in their respective linked legs. A first sense lead 20' threads through the element apertures 14$a$ and 14$c$ and a sense lead 20'' threads through the element apertures 14$b$ and 14$d$. A logic circuit 22' (which, like the logic circuit 22, forms no part of the invention) serves to excite selectively the leads N1, N2, P1, P2, R1 and R2.

To show the operation of the apparatus of FIG. 7 reference should be had to FIGS. 8 and 9, these figures showing that the aforementioned task (i.e., writing and reading the words 10 and 01) can be performed in but ten time increments. Excitation of the lead N1 at time 1 neutralizes the elements 10$a$ and 10$b$ and causes the flux patterns in those elements to be representative of primed ONES. At time 2, the leads P1 and R2 are excited, this causing the flux directions in the legs of the elements 10$b$ to change to store a ZERO; however, the flux pattern in the element 10$a$ is unaffected at time 2 because flux in the leg 16$a$ is driven in the direction of its contained flux. Then, at time 3, both elements 10$a$ and 10$b$ are "set" to store the word 10, i.e., the primed ONE in the element 10$a$ becomes unprimed and the element 10$b$ ZERO remains unaffected. Since, at time 3 flux is driven in the legs 18$c$ and 18$d$ by the leads R1 and R2 respectively, the fields in those legs become defined at time 3. To write the word 01, the leads are excited as follows: At time 4, the lead N2 is excited to neutralize the elements 10$c$ and 10$d$, i.e., the elements 10$c$ and 10$d$ are made to store primed ONES. Then at time 5 the leads P2 and R1 are excited to cause the elements 10$c$ and 10$d$ to store the word 01, such word being however primed. To "set" the matrix for reading purposes the leads R1 and R2 are again excited (time 6). In reading out the word stored by the elements 10$a$ and 10$b$, the lead P1 is excited to prime those elements (time 7); then, the leads R1 and R2 are simultaneously excited (time 8) to cause simultaneously a ONE and a ZERO to be applied respectively to the sense amplifiers 1 and 2. To read-out the word stored by the elements 10$c$ and 10$d$, the lead P2 is excited (time 9) and then (time 10) the leads R1 and R2 are simultaneously excited, thereby causing a ZERO and a ONE to be applied to the sense amplifiers 1 and 2 respectively.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A core memory matrix comprising a plurality of ferromagnetic storage elements each of which is provided with two apertures so positioned to provide each element with two narrow legs saturable magnetically and a wider leg requiring at least as much flux for saturation as both narrow legs together require for their saturation, a first lead threaded to link a narrow leg of all said elements, said first lead being adapted to be excited to drive flux in the linked leg of any given element in a direction which is counter to the direction of the flux in that leg when the element stores a first form of data but in the same direction as the flux in that leg when it stores a second form of data, a plurality of leads equal in number to said plurality of ferromagnetic storage elements each being respectively threaded to link the free narrow leg of one element, each of said last-named leads being adapted to be excited to drive flux in the linked leg of its respective element in a direction which is the same as the direction of flux in that leg when that element stores either form of data, neutralizing means linking all said elements and adapted to drive flux therein so that no element stores said second form of data, means adapted to activate said neutralizing means, then excite one lead linking an element to store in that element said first form of data or simultaneously excite both leads linking that element to store said second form of data, and then excite the lead of said plurality of leads linking the element, whereby the data stored by said element may be read out by first exciting said first lead and then exciting its respective lead from said plurality of leads.

2. A core memory device comprising (*a*) a plurality of bi-aperture magnetic core elements each having two narrow and one substantially wider leg, each said element being adapted to store a first form of data by being magnetized to have the flux in the wider leg flow in one direction and the flux in both narrow legs flow in directions opposite the flux direction in the wider leg, each said element being further adapted to store a different form of data by being magnetized to have the flux in the narrow legs flow in counter directions, said elements being arranged in groups of equal numbers, (*b*) a first plurality of conductors, one for each group, each of which is adapted to pass through an aperture in each element of its respective group of elements, (*c*) a second plurality of conductors, one for each element in a group, each of which is adapted to pass through an aperture of one element in each group, (*d*) a third plurality of conductors, one for each group, each of which is adapted to pass through the aperture in each element of its respective group of elements which does not have a conductor from said second plurality of conductors passing through it, and (*e*) data word writing means for first selectively exciting one conductor in said first group of conductors to cause flux in elements linked thereby to flow differently than the flux in those elements when they store respectively said first form of data, second exciting either one or simultaneously exciting both the other conductors linking the selected elements to write respectively said different or said first form of data, and third exciting the conductors in the second plurality of conductors linking the selected elements to set those elements for reading purposes, whereby the written data word may be read by first exciting the respective conductor in said third plurality of conductors and then exciting the conductors in said second plurality of conductors.

3. A memory device comprising, (*a*) first and second pairs of bi-aperture magnetic core elements, each element of which has its apertures positioned to provide two narrow and one wider leg requiring saturation at least as much flux as is necessary to saturate both narrow legs, (*b*) a first conductor threaded through an aperture in each element in said first pair, (*c*) a second conductor threaded through an aperture in each element of said second pair, (*d*) a third conductor threaded through the free apertures of one element in said first pair and one element in said second pair, (*e*) a fourth conductor threaded through the free aperture of an element in said first pair and the free aperture of an element in said second pair, (*f*) first means for changing the magnetic fields in each element in said first pair, (g) second means for changing the magnetic fields in each element in said second pair, (h) selection means for (1) activating said first field changing means, then exciting one conductor linking each element in said first pair or both conductors linking each element in said first pair to drive flux to write respectively a first or second form of data, said second form of data being characterized by flux flowing in the wide leg of a respective element in one direction and flowing in both narrow legs of that element counter to that direction, said first form of data being characterized by flux flowing in only one narrow leg counter to that direction, and then exciting said third and fourth conductors to drive flux in the element legs that they link in directions counter to directions of flux in the wide legs of those elements when they each store said second form of data, or (2) activating said second field changing means, then exciting one conductor linking each element in said second pair or both conductors linking each element in said second pair to drive flux to write respectively said first or said second form of data, and then exciting said third and fourth conductors to drive flux in the element legs that they link in directions counter to directions of flux in the wide legs of those elements when they each store said second form of data, (i) and means responsive to sense changing fields in said elements linked by said third conductor when said first conductor is excited, said means being also responsive to sense changing fields in the elements linked by said fourth conductor when said second conductor is excited, said field changing means both when activated causing the fields in the elements that they link to be different from the fields in those elements when they respectively store said second form of data.

4. The apparatus of claim 3 wherein both field changing means cause the flux in the wide legs of the elements that they link to be opposite in direction to the flux direction in those legs when the respective elements store said second form of data.

5. The apparatus of claim 3 wherein both field changing means cause the flux in the narrow legs of respective elements that they link to be in opposite directions.

6. A core memory device comprising (a) a plurality of bi-aperture magnetic core elements each having two narrow and one substantially wider leg, each said element being adapted to store a first form of data by being magnetized to have the flux in the wider leg flow in one direction and the flux in both narrow legs flow in directions opposite the flux direction in the wider leg, each said element being further adapted to store a different form of data by being magnetized to have the flux in the narrow legs flow in counter directions, said elements being arranged in groups of equal numbers, (b) a first plurality of conductors, one for each group, each of which is adapted to pass through an aperture in each element of its respective group of elements, (c) a second plurality of conductors, one for each element in a group, each of which is adapted to pass through an aperture of one element in each group, (d) a third plurality of conductors, one for each group, each of which is adapted to pass through the aperture in each element of its respective groups of elements which does not have a conductor from said second plurality of conductors passing through it, and (e) data word writing means for first selectively exciting one conductor in said first plurality of conductors to cause flux in the wider legs of elements linked thereby to flow differently than the flux in those legs when those respective elements store respectively said first form of data, second exciting either one or simultaneously exciting both the other conductors linking the selected elements to write respectively said different or said first form of data, and third exciting the conductors in the second plurality of conductors linking the selected elements to set those elements for reading purposes, whereby the written data word may be read by first exciting the respective conductor in said third plurality of conductors and then exciting the conductors in said second plurality of conductors.

7. A core memory device comprising (a) a plurality of bi-aperture magnetic core elements each having two narrow and one substantially wider leg, each said element being adapted to store a first form of data by being magnetized to have the flux in the wider leg flow in one direction and the flux in both narrow legs flow in directions opposite the flux direction in the wider leg, each said element being further adapted to store a different form of data by being magnetized to have the flux in the narrow legs flow in counter directions, said elements being arranged in groups of equal numbers, (b) a first plurality of conductors, one for each group, each of which is adapted to pass through an aperture in each element of its respective group of elements, (c) a second plurality of conductors, one for each element in a group, each of which is adapted to pass through an aperture of one element in each group, (d) a third plurality of conductors, one for each group, each of which is adapted to pass through the aperture in each element of its respective group of elements which does not have a conductor from said second plurality of conductors passing through it, and (e) data word writing means for first selectively exciting one conductor in said first plurality of conductors to cause flux in only one narrow leg of each element linked thereby to flow differently than the flux in the respective wider legs of those elements when they store respectively said first form of data, second exciting either one or simultaneously exciting both the other conductors linking the selected elements to write respectively said different or said first form of data, and third exciting the conductors in the second plurality of conductors linking the selected elements to set those elements for reading purposes, whereby the written data word may be read by first exciting the respective conductor in said third plurality of conductors and then exciting the conductors in said second plurality of conductors.

No references cited.

IRVING L. SRAGOW, *Primary Examiner.*